United States Patent
Zhang et al.

(10) Patent No.: US 9,028,989 B2
(45) Date of Patent: May 12, 2015

(54) FUEL CELL SYSTEM HAVING A FLUID FLOW DISTRIBUTION FEATURE

(75) Inventors: Yan Zhang, Victor, NY (US); Steven R. Falta, Honeoye Falls, NY (US); Steven D. Burch, Honeoye Falls, NY (US); Glenn W. Skala, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 608 days.

(21) Appl. No.: 13/152,844

(22) Filed: Jun. 3, 2011

(65) Prior Publication Data

US 2012/0308904 A1    Dec. 6, 2012

(51) Int. Cl.
| | |
|---|---|
| *H01M 12/00* | (2006.01) |
| *H01M 2/36* | (2006.01) |
| *H01M 10/50* | (2006.01) |
| *H01M 8/06* | (2006.01) |
| *H01M 8/04* | (2006.01) |
| *H01M 8/00* | (2006.01) |
| *G05D 11/00* | (2006.01) |
| *F16K 49/00* | (2006.01) |
| *F16L 53/00* | (2006.01) |
| *B01D 47/00* | (2006.01) |
| *F22D 1/28* | (2006.01) |
| *F02M 25/10* | (2006.01) |
| *F02M 25/00* | (2006.01) |
| *C10K 1/00* | (2006.01) |
| *C10J 1/00* | (2006.01) |
| *B01F 3/04* | (2006.01) |
| *F28C 1/00* | (2006.01) |
| *H01M 8/10* | (2006.01) |

(52) U.S. Cl.
CPC ............ *H01M 8/04141* (2013.01); *Y02E 60/50* (2013.01); *H01M 2008/1095* (2013.01)

(58) Field of Classification Search
CPC ................. H01M 8/04141; H01M 2008/1095; Y02E 60/50
USPC ................... 429/72, 120, 413, 443, 450, 512; 137/97.03, 98, 99, 100, 118.01, 337; 261/2, 18, 18.2, 19, 20, 16, 75, 94, 102
See application file for complete search history.

(56) References Cited

U.S. PATENT DOCUMENTS

| | | | |
|---|---|---|---|
| 6,471,195 B2 | 10/2002 | Shimanuki et al. | |
| 7,036,466 B2 | 5/2006 | Goebel et al. | |
| 7,156,379 B2 | 1/2007 | Tanihara et al. | |
| 7,459,227 B2 | 12/2008 | Rock et al. | |
| 7,572,531 B2 | 8/2009 | Forte | |
| 2004/0151970 A1* | 8/2004 | Ferguson | 429/38 |
| 2006/0029837 A1 | 2/2006 | Sennoun et al. | |
| 2008/0001313 A1* | 1/2008 | Zhang et al. | 261/100 |
| 2008/0085437 A1 | 4/2008 | Dean et al. | |
| 2009/0193974 A1* | 8/2009 | Montie et al. | 96/8 |
| 2012/0181712 A1* | 7/2012 | Vanderwees et al. | 261/102 |

* cited by examiner

*Primary Examiner* — Patrick Ryan
*Assistant Examiner* — Aaron Greso
(74) *Attorney, Agent, or Firm* — Fraser Clemens Martin & Miller LLC; James D. Miller

(57) ABSTRACT

A fuel cell system includes a water vapor transfer unit and a fluid flow distribution feature, the water vapor transfer unit including a first plate having a plurality of first flow channels for receiving a flow of a first fluid therein, and a second plate having a plurality of second flow channels for receiving a flow of a second fluid therein. The fluid flow distribution feature is configured to control at least one of a volume of flow of the first fluid through the first flow channels and a volume of flow of the second fluid through the second flow channels, wherein at least one of a flow distribution of the first fluid across the first plate and a flow distribution of the second fluid across the second plate is varied.

20 Claims, 8 Drawing Sheets

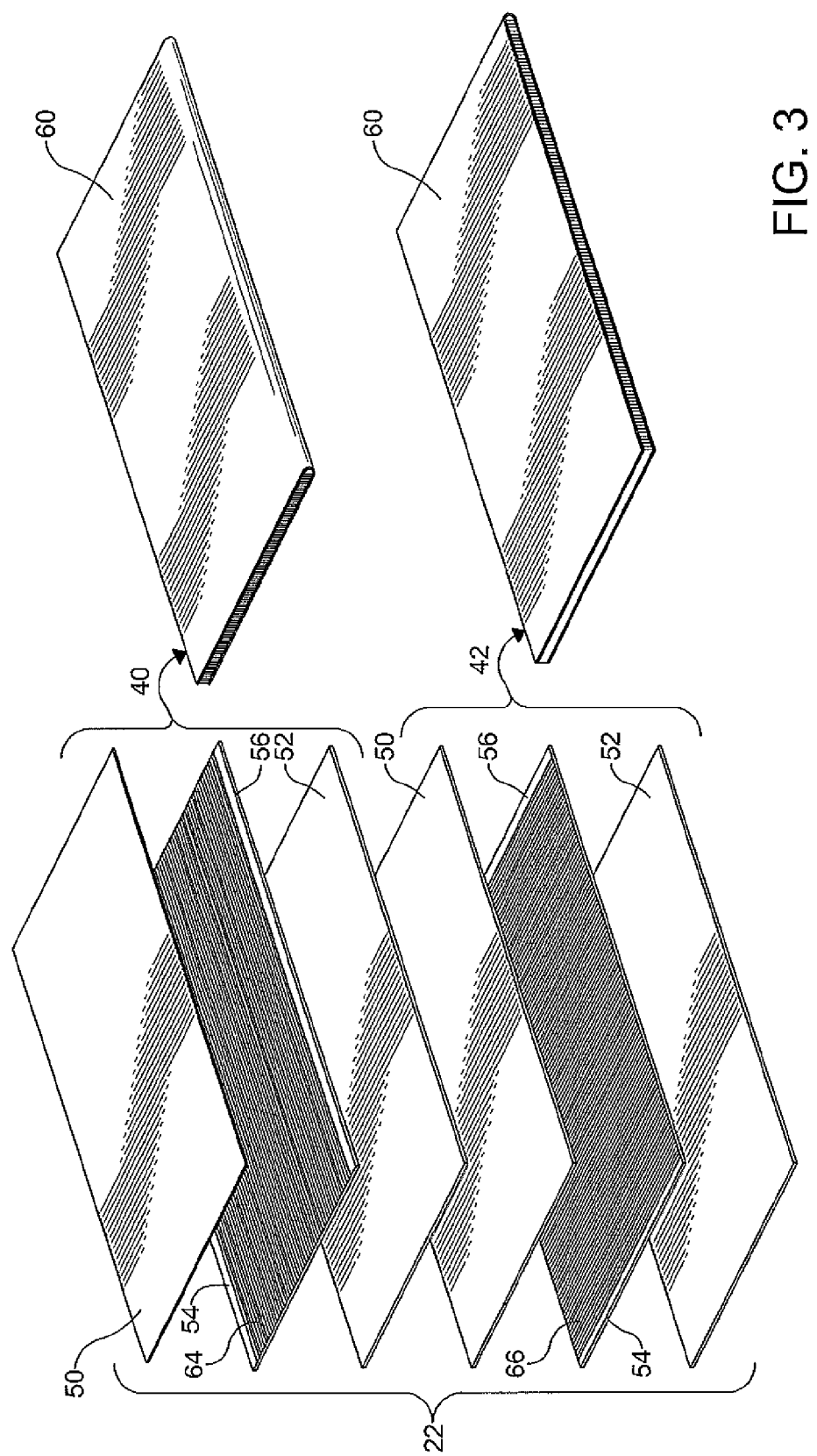

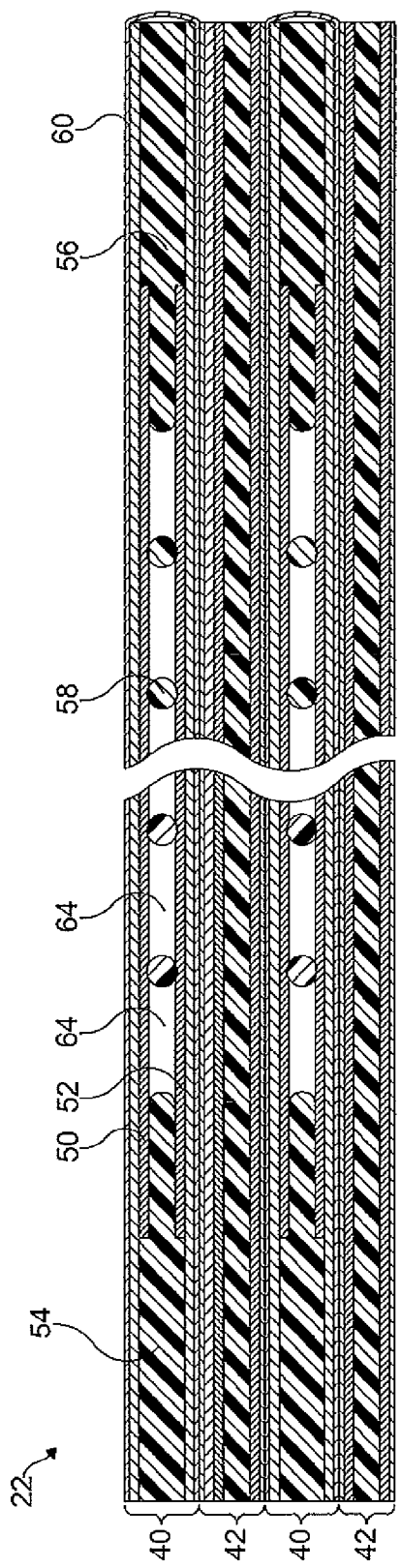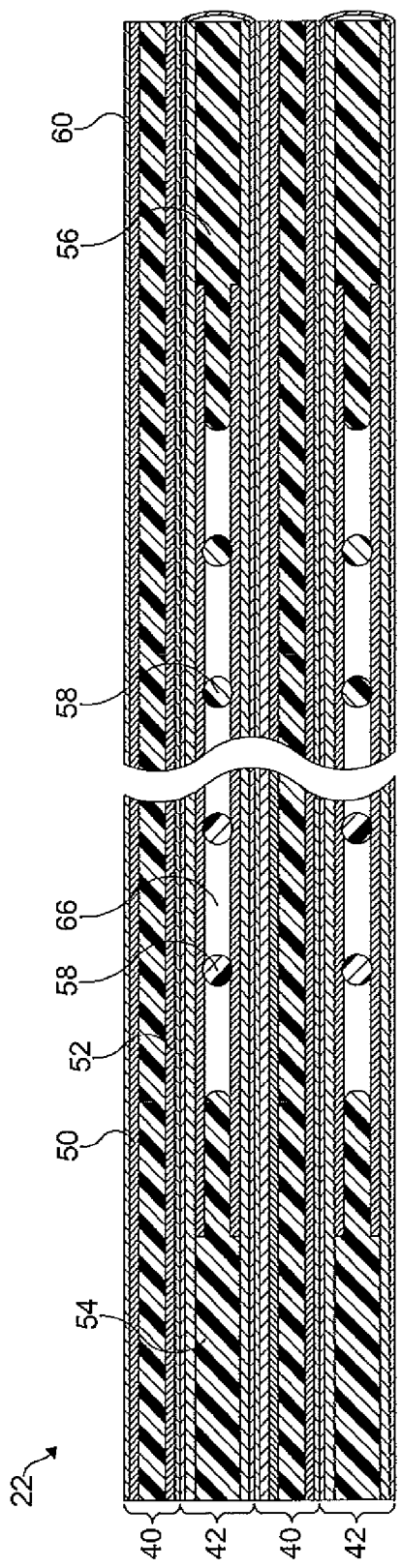

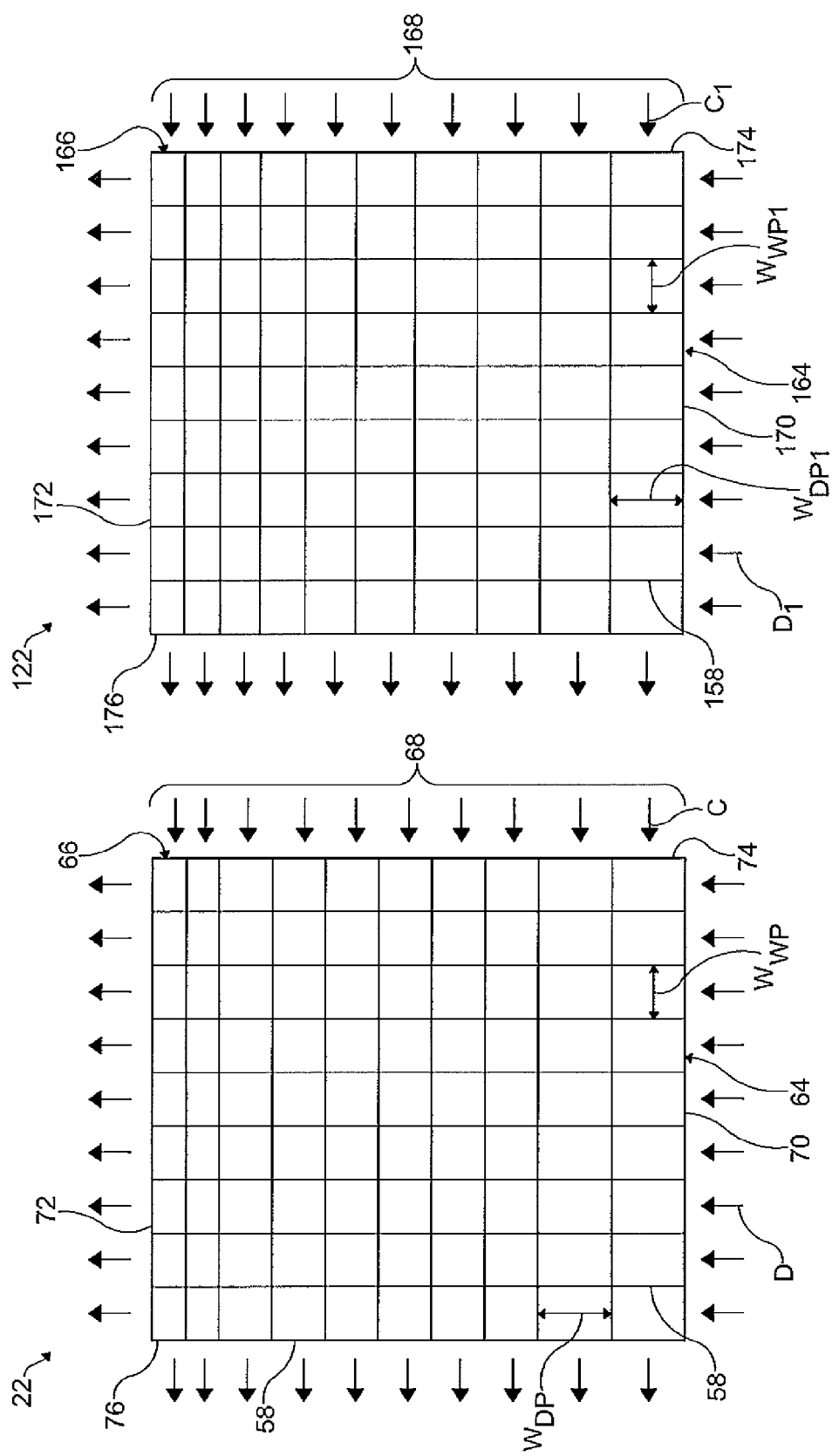

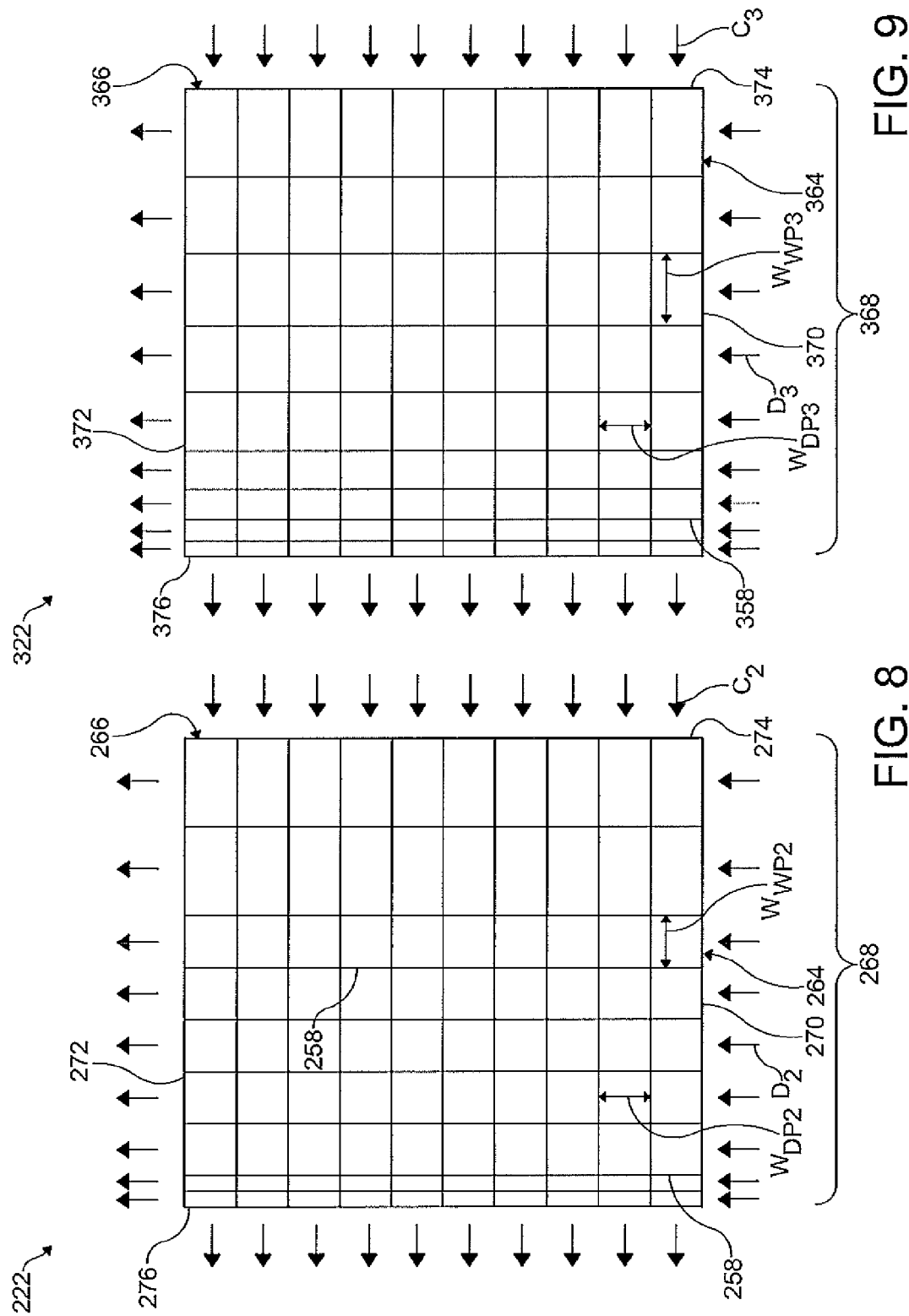

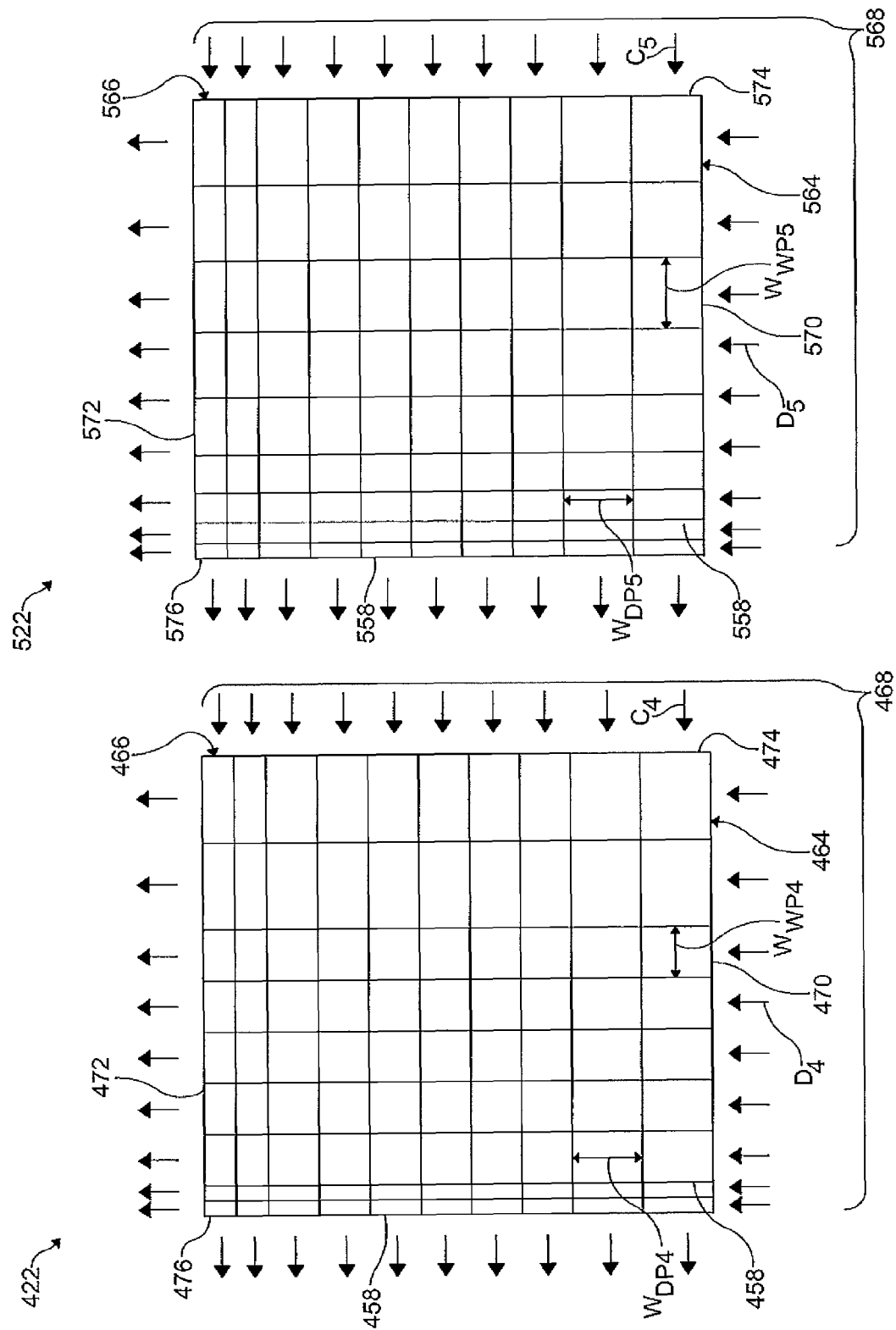

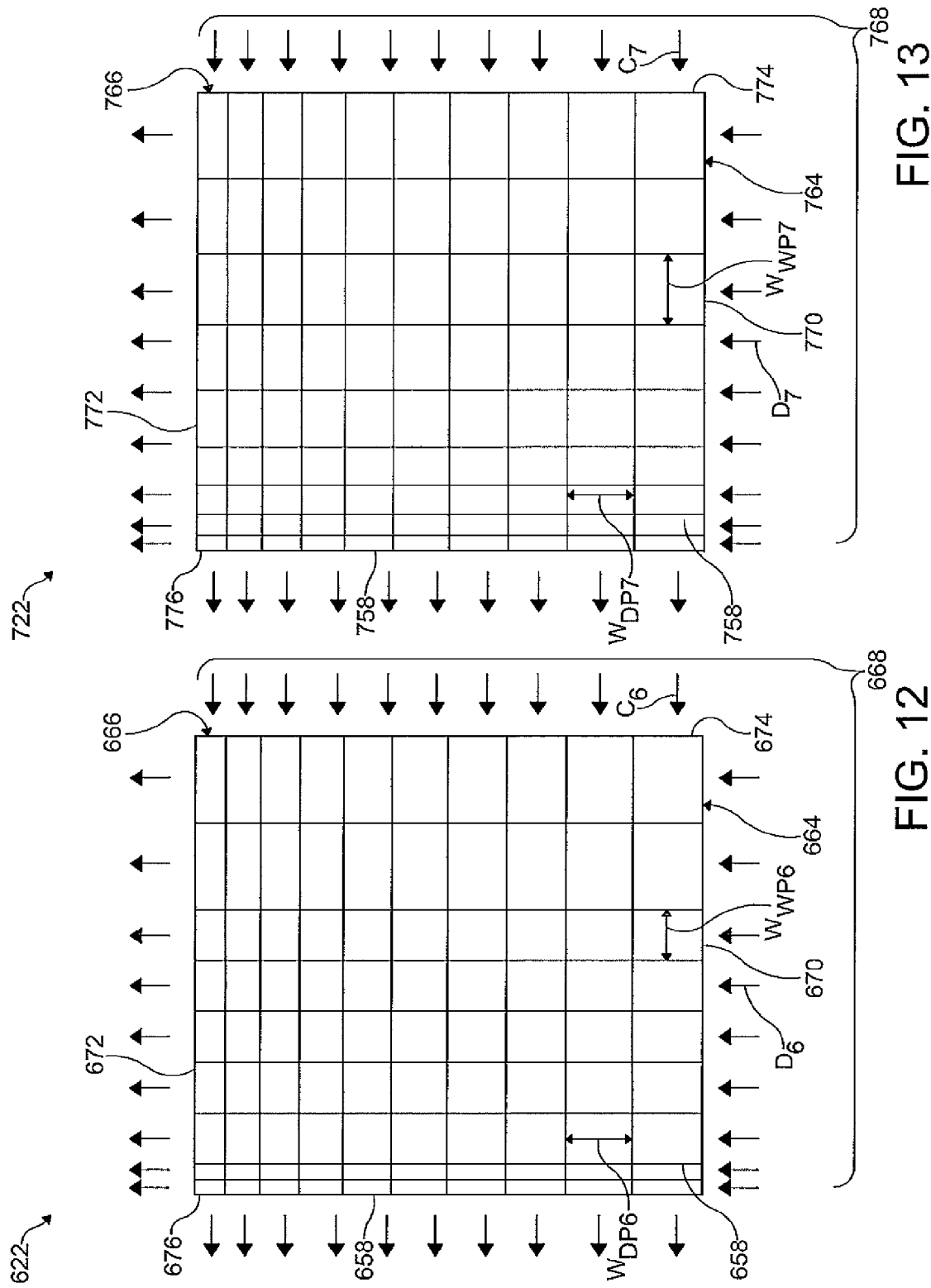

FUEL CELL SYSTEM HAVING A FLUID FLOW DISTRIBUTION FEATURE

FIELD OF THE INVENTION

The invention relates to a fuel cell system and more particularly to a fuel cell system including a fluid flow distribution feature.

BACKGROUND OF THE INVENTION

Presently, fuel cell systems are being proposed for use as a power source in a wide variety of commercial and non-commercial applications. In particular, fuel cell systems are increasingly being used as a replacement for internal combustion engines in motor vehicles. Such a system is disclosed in commonly owned U.S. Pat. No. 7,459,227, hereby incorporated herein by reference in its entirety. Typically, the fuel cell system generates electricity which is then used to charge batteries or to provide power to an electric motor. Fuel cell systems may also be used as stationary electric power plants in buildings and residences, and as portable power in video cameras, computers, and the like.

The fuel cell system is typically comprised of a plurality of fuel cells bundled together and arranged in electrical series to form a stack. Since the fuel cells can be assembled into stacks of varying sizes, the fuel cell system can be designed to produce a desired energy output level providing flexibility of design for different applications. The fuel cells are electrochemical devices which directly combine gaseous reactants such as a fuel (e.g. hydrogen) and an oxidant (e.g. oxygen) to produce electricity. The oxygen is typically supplied by an air stream. The gaseous reactants combine to result in the formation of water. Other fuels can be used such as natural gas, methanol, gasoline, and coal-derived synthetic fuels, for example. The basic process employed by the fuel cell system is efficient, substantially pollution-free, quiet, free from moving parts (other than an air compressor, cooling fans, pumps and actuators), and may be constructed to leave only heat and water as by-products.

Different fuel cell types can be provided such as phosphoric acid, alkaline, molten carbonate, solid oxide, and proton exchange membrane (PEM), for example. The basic components of a PEM-type fuel cell are two electrodes separated by a polymer electrolyte membrane. Each electrode is coated on one side with a thin catalyst layer. The electrodes, catalyst, and membrane together form a membrane electrode assembly (MEA).

In a typical PEM-type fuel cell, the MEA is sandwiched between anode and cathode diffusion media (hereinafter "DMs") or diffusion layers that are formed from a resilient, conductive, and gas permeable material such as carbon fabric or paper. The DMs serve as the primary current collectors for the anode and cathode, as well as provide mechanical support for the MEA. Alternatively, the DMs may contain the catalyst layer and be in contact with the membrane. The DMs and MEA are pressed between a pair of electrically conductive plates which serve as secondary current collectors for collecting the current from the primary current collectors. The plates conduct electrical current between adjacent cells internally of the stack in the case of bipolar plates and conduct current externally of the stack in the case of monopolar plates at the end of the stack.

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the fuel and the oxidant to the electrodes on either side of the PEM. In particular, the fuel flows through the channels to the anode where the catalyst promotes separation into protons and electrons. On the opposite side of the PEM, the oxidant flows through the channels to the cathode where the oxidant attracts the protons through the PEM. The electrons are captured as useful energy through an external circuit and are combined with the protons and oxidant to produce water vapor at the cathode side.

In order to perform within a desired efficiency range, it is desirable to maintain the membranes in a humidified condition. Therefore, it is necessary to provide a means for maintaining the fuel cell membranes in the humidified condition. The humidified condition helps avoid a shortened life of the membranes, as well as to maintain the desired efficiency of operation. For example, lower water content of the membrane leads to a higher proton conduction resistance, thus resulting in a higher ohmic voltage loss. The humidification of the feed gases, in particular at the cathode inlet, is desirable in order to maintain sufficient water content in the membrane. Humidification in a fuel cell is discussed in commonly owned U.S. Pat. No. 7,036,466; commonly owned U.S. Pat. App. Pub. No. 2006/0029837; and commonly owned U.S. Pat. No. 7,572,531, each of which is hereby incorporated herein by reference in its entirety.

To maintain a desired moisture level, an air humidifier is frequently used to humidify a supply stream of the air used in the fuel cell. The air humidifier normally consists of a round or box type air humidification module that is installed into a housing of the air humidifier. Examples of this type of air humidifier are shown and described in U.S. Pat. No. 7,156,379, hereby incorporated herein by reference in its entirety, and U.S. Pat. No. 6,471,195, hereby incorporated herein by reference in its entirety.

Membrane humidifiers, such as water vapor transfer (WVT) units, have also been utilized to fulfill fuel cell humidification requirements. For the automotive fuel cell humidification application, such a membrane humidifier needs to be compact, exhibit low pressure drop, and have high performance characteristics. Typical WVT units include a wet plate that includes a plurality of flow channels formed therein adjacent a diffusion media. The flow channels of the wet plate are adapted to convey a wet fluid from the cathode of the fuel cell to the exhaust. Typical WVT units also include a dry plate that includes a plurality of flow channels formed therein adjacent a diffusion media. The flow channels of the dry plate are adapted to convey a dry fluid from a source of gas to the cathode of the fuel cell. A similar WVT unit can be used for an anode side of the fuel cell, or otherwise as desired.

One type of WVT unit is a cross-flow WVT unit in which a direction of flow of the wet fluid in the wet plate is perpendicular to a direction of flow of the dry fluid in the dry plate. Accordingly, the flow channels of the wet plate are formed perpendicular to the flow channels of the dry plate. The flow channels of the wet and dry plates are typically uniformly spaced apart at a desired interval. The uniform spacing of the flow channels of the plates results in uneven relative humidity distribution across outlets of the dry plate. Relative humidity levels are typically highest in the outlets of the flow channels of the dry plate adjacent inlets of the flow channels of the wet plate. Conversely, the relative humidity levels are typically lowest in the outlets of the flow channels of the dry plate adjacent outlets of the flow channels of the wet plate.

Particularly at idle conditions of the fuel cell system, when water vapor transfer efficiency is maximized and an operating temperature of the fuel cell system is minimized, the relative humidity in the flow channels of the dry plates can reach 100%. This can cause liquid water to form at the outlets of the flow channels of the dry plate adjacent the inlets of the flow channels of the wet plate and enter the fuel cell stack. Liquid water in the fuel cell stack decreases durability and can result in unstable performance of the fuel cell system. Typically, a liquid water separator is employed to militate against the liquid water from entering the fuel cell stack, adding cost and complexity to the fuel cell system. However, an effectiveness of the liquid water separator may be less than optimal, permitting a portion of the liquid water to enter the fuel cell stack.

It would be desirable to produce a fuel cell system including a fluid flow distribution feature, which minimizes a variation of relative humidity across the outlets of the dry flow channels of the WVT unit, as well as a cost and a complexity of the fuel cell system.

SUMMARY OF THE INVENTION

In concordance and agreement with the present invention, a fuel cell system including a fluid flow distribution feature, which minimizes a variation of the relative humidity distribution across the outlets of the flow channels of the dry plate of the WVT unit, as well as a cost and a complexity of the fuel cell system.

In one embodiment, the fuel cell system comprises: a water vapor transfer unit including a first plate and a second plate, the first plate having a plurality of first flow channels for receiving a flow of a first fluid therein, and the second plate having a plurality of second flow channels for receiving a flow of a second fluid therein; and a fluid flow distribution feature configured to control at least one of a flow of the first fluid through the first flow channels and a flow of the second fluid through the second flow channels, wherein at least one of a flow distribution of the first fluid across the first plate and a flow distribution of the second fluid across the second plate is varied.

In another embodiment, the fuel cell system comprises: a water vapor transfer unit including a first plate and a second plate, the first plate having a plurality of first flow channels for receiving a flow of a first fluid therein, and the second plate having a plurality of second flow channels for receiving a flow of a second fluid therein, wherein each of the flow channels of the plates includes an inlet and an outlet; and a fluid flow distribution feature including the first flow channels and the second flow channels, wherein a volume of the first flow channels adjacent the inlets of the second flow channels is greater than a volume of the first flow channels adjacent the outlets of the second flow channels, and a volume of the second flow channels adjacent the inlets of the first flow channels is greater than a volume of the second flow channels adjacent the outlets of the first flow channels.

In another embodiment, the fuel cell system comprises: a water vapor transfer unit including a first plate and a second plate, the first plate having a plurality of first flow channels for receiving a flow of a first fluid therein, and the second plate having a plurality of second flow channels for receiving a flow of a second fluid therein, wherein the first flow channels are substantially perpendicular to the second flow channels; and a first fluid flow distribution feature disposed in a charge air cooler of the fuel cell system upstream of the water vapor transfer unit to control a volume of flow of the first fluid through the first flow channels, wherein the fluid flow distribution feature directs a greater volume of flow of the first fluid through the first flow channels adjacent the inlets of the second flow channels than through the first flow channels adjacent the outlets of the second flow channels.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is an exploded side perspective view of a portion of the water vapor transfer unit illustrated in FIG. 2;

FIG. 4 is an enlarged fragmentary cross-sectional side-elevational view of a portion of the water vapor transfer unit illustrated in FIG. 2 taken along section line 4-4;

FIG. 5 is an enlarged fragmentary cross-sectional side elevational view of a portion of the water vapor transfer unit illustrated in FIG. 2 taken along section line 5-5;

FIG. 6 is a schematic diagram of the water vapor transfer unit including a fluid flow distribution feature according to an embodiment of the invention;

FIG. 7 is a schematic diagram of the water vapor transfer unit including a fluid flow distribution feature according to another embodiment of the invention;

FIG. 8 is a schematic diagram of the water vapor transfer unit including a fluid flow distribution feature according to another embodiment of the invention;

FIG. 9 is a schematic diagram of the water vapor transfer unit including a fluid flow distribution feature according to another embodiment of the invention;

FIG. 10 is a schematic diagram of the water vapor transfer unit including a fluid flow distribution feature according to another embodiment of the invention;

FIG. 11 is a schematic diagram of the water vapor transfer unit including a fluid flow distribution feature according to another embodiment of the invention;

FIG. 12 is a schematic diagram of the water vapor transfer unit including a fluid flow distribution feature according to another embodiment of the invention;

FIG. 13 is a schematic diagram of the water vapor transfer unit including a fluid flow distribution feature according to another embodiment of the invention.

DESCRIPTION OF THE PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner.

Figure 1:
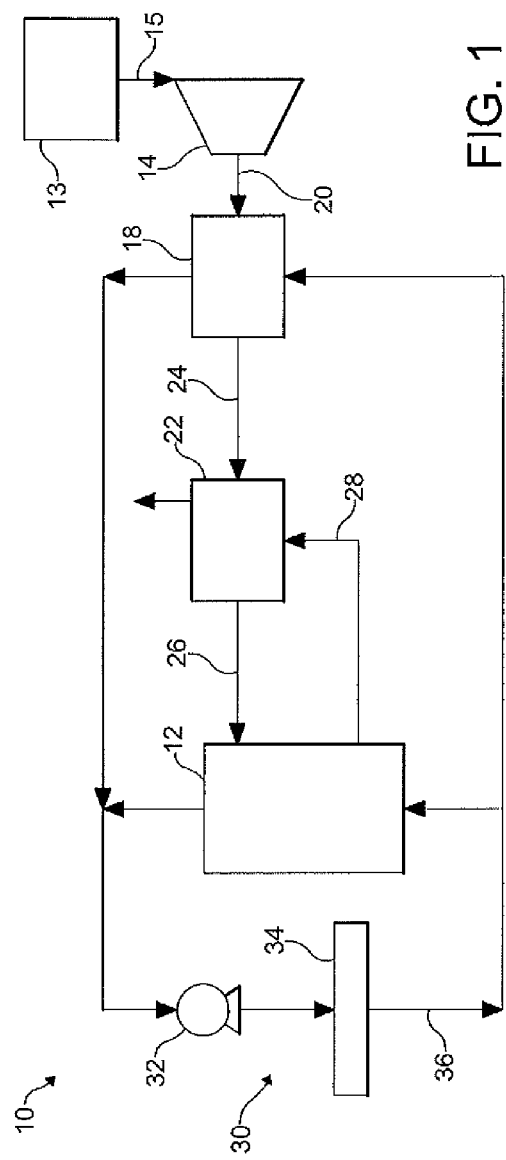
FIG. 1 is a schematic block diagram of a fuel cell system employing a water vapor transfer unit according to an embodiment of the present invention.

FIG. 1 schematically illustrates a fuel cell system 10 according to an embodiment of the present invention. The fuel cell system 10 includes a fuel cell stack 12 having a cathode side and an anode side. A cathode supply fluid stream, depending on a load requirement of the fuel cell stack 12, is supplied from a fluid source 13 to a compressor 14 through a conduit 15. Within the compressor 14, the cathode supply fluid stream is compressed. As shown, the compressor 14 is fluidly connected to a charge air cooler (CAC) 18 through a conduit 20. The CAC 18 cools the cathode supply fluid stream that has been heated as a result of the compression by the compressor 14. It is understood that the CAC 18 can be any type of CAC as desired. The CAC 18 is fluidly connected to a water vapor transfer (WVT) unit 22 through a conduit 24.

The WVT unit 22 is also fluidly connected to the fuel cell stack 12. The WVT unit 22 shown is fluidly connected to the cathode side of the fuel cell system 10. However, it is understood that the WVT unit 22 can be fluidly connected to the anode side of the fuel cell system 10 or otherwise as desired. The cathode supply fluid stream is supplied from the WVT unit 22 to the fuel cell stack 12 through a cathode supply conduit 26. A cathode exhaust fluid stream is provided from the fuel cell stack 12 to the WVT unit 22 through a cathode exhaust conduit 28. Water and/or water vapor in the cathode exhaust fluid stream humidifies the cathode supply fluid stream within the WVT unit 22 to a desired humidity level.

The fuel cell system 10 may include other components necessary for operation such as a temperature sensor (not shown) for measuring a temperature of the cathode supply fluid stream exiting the CAC 18, a relative humidity sensor (not shown) for measuring a relative humidity of the cathode supply fluid stream supplied to the fuel cell stack 12, and a fuel cell stack cooling system 30, for example. In the embodiment shown, the fuel cell stack cooling system 30 includes a pump 32 and a radiator 34. The pump 32 causes a cooling fluid (e.g. refrigerant) to flow through a coolant loop 36, and into and through the fuel cell stack 12. The heated cooling fluid from the fuel cell stack 12 is cooled by a transfer of heat to the ambient air within the radiator 32.

Figure 2:
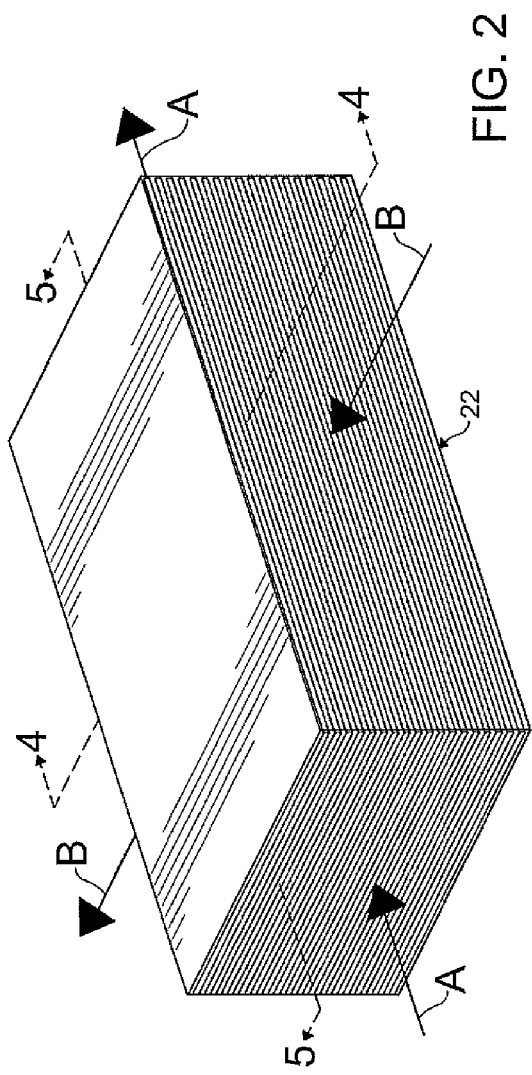
FIG. 2 is a schematic side perspective view of the water vapor transfer unit illustrated in FIG. 1.

FIGS. 2-5 illustrate the WVT unit 22 according to an embodiment of the invention. The WVT unit 22 includes a wet plate 40 to receive a wet fluid (e.g. the cathode exhaust fluid stream), and a dry plate 42 to receive a dry fluid (e.g. the cathode supply fluid stream). As used herein, "wet fluid" means a fluid including water vapor and/or liquid water therein at a level above that of the dry fluid. "Dry fluid" means a fluid absent water vapor or including water vapor and/or liquid water therein at a level lower than that of the wet fluid. A pressure of the wet fluid caused to flow through the wet plate 40 is typically lower than a pressure of the dry fluid caused to flow through the dry plate 42. As illustrated in FIG. 2, a direction of flow of the wet fluid, indicated by arrows A, is perpendicular to a direction of flow of the dry fluid, indicated by arrows B, to provide a cross-flow configuration. Other configurations, however, such as co-flow or counter-flow, for example, can be employed as desired.

Each of the plates 40, 42 shown in FIGS. 3-5 includes a substantially planar first layer 50, a substantially planar second layer 52, a substantially planar first sealing bar 54, a substantially planar second sealing bar 56, and a substantially planar array of elongate ribbons 58. It is understood that the layers 50, 52 can be used for only the wet plate 40 or the dry plate 42, if desired. In the embodiment shown, the layers 50, 52 are diffusion media. The diffusion media may be formed from any conventional material such as a glass fiber, a glass based-paper, a carbon fabric, a paper, and the like, for example.

At least a portion of the first sealing bar 54 is disposed between and adhered to an outer edge of each of the first layer 50 and the second layer 52. At least a portion of the second sealing bar 56 is disposed between and adhered to an outer edge of each of the first layer 50 and the second layer 52. It is understood that the sealing bars 54, 56 can be entirely disposed between the layers 50, 52 if desired. In the embodiment shown, the portions of the sealing bars 54, 56 are melt-formed with the layers 50, 52. It is understood that the layers 50, 52 can be adhered to the sealing bars 54, 56 by any process as desired such as by an adhesive process, for example. It is further understood that the sealing bars 54, 56 can be formed from any conventional material as desired such as a steel, a polymer, a plastic, a graphite, and a composite material, for example. A membrane 60 is wrapped around the layers 50, 52 and at least one of the sealing bars 54, 56. As shown, the membrane 60 is adhered to the layers 50, 52 and the sealing bar 56 by an adhesive material at an outer peripheral edge of the each of the plates 40, 42 to maximize sealing properties therebetween.

As shown, the ribbons 58 are disposed between and at least partially adhered to the first layer 50 and the second layer 52. The ribbons 58 are typically polymer strands having a cylindrical shape and a substantially circular cross-sectional shape. It is understood that the ribbons 58 can be formed from any material as desired such as a steel, a polymer, a graphite, and a composite material, for example. It is further understood that the ribbons 58 can have any shape and size as desired. The ribbons 58 cooperate with the layers 50, 52 to define a plurality of flow channels 64 in the wet plate 40 and a plurality of flow channels 66 in the dry plate 42. It is understood that any number of flow channels 64, 66 can be formed in the WVT unit 22 as desired. The flow channels 64 formed in the wet plate 40 convey the wet fluid from the cathode side of the fuel cell system 10 to an exhaust (not shown). The flow channels 66 formed in the dry plate 42 convey the dry fluid from the fluid source 13 to the cathode side of the fuel cell system 10.

FIG. 6 schematically illustrates the WVT unit 22 including a fluid flow distribution feature 68 according to an embodiment of the invention. A direction of flow C of the dry fluid through the flow channels 66 is substantially perpendicular to a direction of flow D of the wet fluid through the flow channels 64 of the wet plate 40. Each of the flow channels 64 of the wet plate 40 has an inlet 70 and an outlet 72 and each of the flow channels 66 of the dry plate 42 has an inlet 74 and an outlet 76. As illustrated, each individual flow channel 64 of the wet plate 40 is formed to have a substantially uniform cross-sectional flow area from the inlet 70 to the outlet 72. Further, a width $W_{WP}$ of each of the flow channels 64 is substantially the same as a width $W_{WP}$ of each adjacent flow channel 64. Accordingly, a volume of each of the flow channels 64 and the volume of flow of the wet fluid therein are substantially equal and uniform across the wet plate 40.

As illustrated, each individual flow channel 66 of the dry plate 42 is formed to have a substantially uniform cross-sectional flow area from the inlet 74 to the outlet 76. Groups of the flow channels 66 having different widths $W_{DP}$ form the fluid flow distribution feature 68 of the WVT unit 22. The fluid flow distribution feature 68 controls a volume of flow of the dry fluid through each of the flow channels 66 and a flow distribution of the dry fluid across the dry plate 42. In particular, a first group of flow channels 66 adjacent the inlets 70 of the flow channels 64 of the wet plate 40 has a greater width $W_{DP}$ than a second group of flow channels 66 adjacent thereto so that each of the first group of flow channels 66 can accommodate more dry fluid than each of the second group of flow channels 66. The second group of flow channels 66 has a greater width $W_{DP}$ than a third group of flow channels 66 adjacent the outlets 72 of the flow channels 64 of the wet plate 40 so that each of the second group of flow channels 66 can accommodate more dry fluid than each of the third group of flow channels 66. Accordingly, a volume of each of the flow channels 66 and the volume of flow of the dry fluid therein decrease across the dry plate 42 from the inlets 70 of the wet plate 40 to the outlets 72 thereof. Additional or fewer groups of flow channels 66 than shown can be employed if desired. In the embodiment shown, the volumes of the flow channels 66 of the dry plate 42 are modified by changing the widths $W_{DP}$ of the flow channels 66. It is understood, however, that the volumes of the flow channels 66 can be modified by varying a depth, a cross-sectional shape, or a length of the flow channels 66, if desired.

An amount of the water and/or water vapor transferred from the wet fluid to the dry fluid is greatest in the first group of flow channels 66 adjacent the inlets 70 of the flow channels 64 of the wet plate 40. In other words, the greatest transfer of the water and/or water vapor occurs in the flow channels 66 of the dry plate 42 with the greatest volume of flow of the dry fluid. As a result, a relative humidity level of the dry fluid at the outlets 76 of the flow channels 66 adjacent the inlets 70 of the flow channels 64 of the wet plate 40 is caused to decrease to within a desired relative humidity level range, and thereby, militate against a formation of liquid water in the fluid channels 66 of the dry plate 42. In a non-limiting example, the desired relative humidity level range is about 45% to about 85%. Conversely, the amount of the water and/or water vapor transferred from the wet fluid to the dry fluid is least in the third group of flow channels 66 adjacent the outlets 72 of the flow channels 64 of the wet plate 40. In other words, the least transfer of the water and/or water vapor occurs in the flow channels 66 of the dry plate 42 with the least volume of flow of the dry fluid. As a result, a relative humidity level of the dry fluid at the outlets 76 of the flow channels 66 adjacent the outlets 72 of the flow channels 64 of the wet plate 40 is caused to increase to within the desired humidity level range. Because the relative humidity level of the dry fluid is decreased at the outlets 76 of the flow channels 66 adjacent the inlets 70 of the flow channels 64 of the wet plate 40 and increased at the outlets 76 of the flow channels 66 adjacent the outlets 72 of the flow channels 64 of the wet plate 40, a variation in relative humidity distribution of the dry fluid across the outlets 76 of the flow channels 66 of the dry plate 42 is minimized.

FIG. 7 schematically illustrates the WVT unit 122 including a fluid flow distribution feature 168 according to another embodiment of the invention. A direction of flow $C_1$ of the dry fluid through the flow channels 166 is substantially perpendicular to a direction of flow $D_1$ of the wet fluid through the flow channels 164 of the wet plate 140. Each of the flow channels 164 of the wet plate 140 has an inlet 170 and an outlet 172 and each of the flow channels 166 of the dry plate 142 has an inlet 174 and an outlet 176. As illustrated, each individual flow channel 164 of the wet plate 140 is formed to have a substantially uniform cross-sectional flow area from the inlet 170 to the outlet 172. Further, a width $W_{WP1}$ of each of the flow channels 164 is substantially the same as a width $W_{WP1}$ of each adjacent flow channel 164. Accordingly, a volume of each of the flow channels 164 and the volume of flow of the wet fluid therein are substantially equal and uniform across the wet plate 140.

As illustrated, each individual flow channel 166 of the dry plate 142 is formed to have a substantially uniform cross-sectional flow area from the inlet 174 to the outlet 176. Further, each of the flow channels 166 having a different width $W_{DP1}$ forms the fluid flow distribution feature 168 of the WVT unit 122. The fluid flow distribution feature 168 including each of the flow channels 166 having different widths $W_{DP1}$ differentiates the WVT unit 122 from the WVT unit 22 shown in FIG. 6 and described hereinabove. The fluid flow distribution feature 168 controls a volume of flow of the dry fluid through each of the flow channels 166 and a flow distribution of the dry fluid across the dry plate 142. In particular, starting with the flow channels 166 adjacent the inlets 170 of the flow channels 164 of the wet plate 140, each of the flow channels 166 of the dry plate 142 has a greater width $W_{DP1}$ than the flow channel 166 adjacent thereto. Accordingly, each of the of flow channels 166, starting with the flow channel 166 adjacent the inlets 170 of the flow channels 164 of the wet plate 140, can accommodate more dry fluid than the adjacent flow channels 166. Further, a volume of each of the flow channels 166 and the volume of flow of the dry fluid therein decrease across the dry plate 142 from the inlets 170 of the wet plate 140 to the outlets 172 thereof. In the embodiment shown, the volumes of the flow channels 166 of the dry plate 142 are modified by changing the widths $W_{DP1}$ of the flow channels 166. It is understood, however, that the volumes of the flow channels 166 can be modified by varying a depth, a cross-sectional shape, or a length of the flow channels 166, if desired.

An amount of the water and/or water vapor transferred from the wet fluid to the dry fluid is greatest in the flow channels 166 adjacent the inlets 170 of the flow channels 164 of the wet plate 140. In other words, the greatest transfer of the water and/or water vapor occurs in the flow channels 166 of the dry plate 142 with the greatest volume of flow of the dry fluid. As a result, a relative humidity level of the dry fluid at the outlets 176 of the flow channels 166 adjacent the inlets 170 of the flow channels 164 of the wet plate 140 is caused to decrease to within a desired relative humidity level range and thereby, militate against a formation of liquid water in the fluid channels 166 of the dry plate 142. In a non-limiting example, the desired relative humidity level range is about 45% to about 85%. Conversely, the amount of the water and/or water vapor transferred from the wet fluid to the dry fluid is least in the flow channels 166 adjacent the outlets 172 of the flow channels 164 of the wet plate 140. In other words, the least transfer of the water and/or water vapor occurs in the flow channels 166 of the dry plate 142 with the least volume of flow of the dry fluid. As a result, a relative humidity level of the dry fluid at the outlets 176 of the flow channels 166 adjacent the outlets 172 of the flow channels 164 of the wet plate 140 is caused to increase to within the desired humidity level range. Because the relative humidity level of the dry fluid is decreased at the outlets 176 of the flow channels 166 adjacent the inlets 170 of the flow channels 164 of the wet plate 140 and increased at the outlets 176 of the flow channels 166 adjacent the outlets 172 of the flow channels 164 of the wet plate 140, a variation in relative humidity distribution of the dry fluid across the outlets 176 of the flow channels 166 of the dry plate 142 is minimized.

FIG. 8 schematically illustrates the WVT unit 222 including a fluid flow distribution feature 268 according to another embodiment of the invention. A direction of flow $C_2$ of the dry fluid through the flow channels 266 is substantially perpendicular to a direction of flow $D_2$ of the wet fluid through the flow channels 264 of the wet plate 240. Each of the flow channels 264 of the wet plate 240 has an inlet 270 and an outlet 272 and each of the flow channels 266 of the dry plate 242 has an inlet 274 and an outlet 276.

As illustrated, each individual flow channel 264 of the wet plate 240 is formed to have a substantially uniform cross-sectional flow area from the inlet 270 to the outlet 272. Groups of the flow channels 264 having different widths $W_{WP2}$ form the fluid flow distribution feature 268 of the WVT unit 222. The fluid flow distribution feature 268 including the groups of the flow channels 264 having different widths $W_{WP2}$ differentiates the WVT unit 222 from the WVT units 22, 122 shown in FIGS. 6-7 and described hereinabove. The fluid flow distribution feature 268 controls a volume of flow of the wet fluid through each of the flow channels 264 and a flow distribution of the wet fluid across the wet plate 240. In particular, a first group of flow channels 264 adjacent the inlets 274 of the flow channels 266 of the dry plate 242 has a greater width $W_{WP2}$ than a second group of flow channels 264 adjacent thereto so that each of the first group of flow channels 264 can accommodate more wet fluid than each of the second group of flow channels 264. The second group of flow channels 264 has a greater width $W_{WP2}$ than a third group of flow channels 264 adjacent the outlets 276 of the flow channels 266 of the dry plate 242 so that each of the second group of flow channels 264 can accommodate more wet fluid than each of the third group of flow channels 264. Accordingly, a volume of each of the flow channels 264 and the volume of flow of the wet fluid therein decrease across the wet plate 240 from the inlets 274 of the dry plate 242 to the outlets 276 thereof. Additional or fewer groups of flow channels 264 than shown can be employed if desired. In the embodiment shown, the volumes of the flow channels 264 of the wet plate 240 are modified by changing the widths $W_{WP2}$ of the flow channels 264. It is understood, however, that the volumes of the flow channels 264 can be modified by varying a depth, a cross-sectional shape, or a length of the flow channels 264, if desired.

As illustrated, each individual flow channel 266 of the dry plate 242 is formed to have a substantially uniform cross-sectional flow area from the inlet 274 to the outlet 276. Further, a width $W_{DP2}$ of each of the flow channels 266 is substantially the same as a width $W_{DP2}$ of each adjacent flow channel 266. Accordingly, a volume of each of the flow channels 266 and the volume of flow of the dry fluid therein are substantially equal and uniform across the dry plate 242.

A relative humidity level of the dry fluid is greatest at the outlets 276 of the flow channels 266 of the dry plate 242 adjacent the inlets 270 of the flow channels 264 of the wet plate 240. The fluid flow distribution feature 268 of wet plate 240 described hereinabove reduces the volume of flow of the wet fluid in flow channels 264 of the wet plate 240 adjacent the outlets 276 of the flow channels 266 of the dry plate 242. As a result, the relative humidity level of the dry fluid at the outlets 276 of the flow channels 266 adjacent the inlets 270 of the flow channels 264 of the wet plate 240 is caused to decrease to within a desired relative humidity level range, and thereby, militate against a formation of liquid water in the fluid channels 266 of the dry plate 242. In a non-limiting example, the desired relative humidity level range is about 45% to about 85%. A variation in relative humidity distribution of the dry fluid across the outlets 276 of the flow channels 266 of the dry plate 242 is minimized.

FIG. 9 schematically illustrates the WVT unit 322 including a fluid flow distribution feature 368 according to another embodiment of the invention. A direction of flow $C_3$ of the dry fluid through the flow channels 366 is substantially perpendicular to a direction of flow $D_3$ of the wet fluid through the flow channels 364 of the wet plate 340. Each of the flow channels 364 of the wet plate 340 has an inlet 370 and an outlet 372 and each of the flow channels 366 of the dry plate 342 has an inlet 374 and an outlet 376.

As illustrated, each individual flow channel 364 of the wet plate 340 is formed to have a substantially uniform cross-sectional flow area from the inlet 370 to the outlet 372. Further, each of the flow channels 364 having a different width $W_{WP3}$ forms the fluid flow distribution feature 368 of the WVT unit 322. The fluid flow distribution feature 368 including each of the flow channels 366 having different widths $W_{WP3}$ differentiates the WVT unit 322 from the WVT units 22, 122, 222 shown in FIGS. 6-8 and described hereinabove. The fluid flow distribution feature 368 controls a volume of flow of the wet fluid through each of the flow channels 364 and a flow distribution of the wet fluid across the wet plate 340. In particular, starting with the flow channels 364 adjacent the inlets 374 of the flow channels 366 of the dry plate 342, each of the flow channels 364 of the wet plate 340 has a greater width $W_{WP3}$ than the flow channel 364 adjacent thereto. Accordingly, each of the of flow channels 364, starting with the flow channel 364 adjacent the inlets 374 of the flow channels 366 of the dry plate 342, can accommodate more wet fluid than the adjacent flow channels 364. Further, a volume of each of the flow channels 364 and the volume of flow of the wet fluid therein decrease across the wet plate 340 from the inlets 374 of the dry plate 342 to the outlets 376 thereof. In the embodiment shown, the volumes of the flow channels 364 of the wet plate 340 are modified by changing the widths $W_{WP3}$ of the flow channels 364. It is understood, however, that the volumes of the flow channels 364 can be modified by varying a depth, a cross-sectional shape, or a length of the flow channels 364, if desired.

As illustrated, each individual flow channel 366 of the dry plate 342 is formed to have a substantially uniform cross-sectional flow area from the inlet 374 to the outlet 376. Further, a width $W_{DP3}$ of each of the flow channels 366 is substantially the same as a width $W_{DP3}$ of each adjacent flow channel 366. Accordingly, a volume of each of the flow channels 366 and the volume of flow of the dry fluid therein are substantially equal and uniform across the dry plate 342.

A relative humidity level of the dry fluid is greatest at the outlets 376 of the flow channels 366 of the dry plate 342 adjacent the inlets 370 of the flow channels 364 of the wet plate 340. The fluid flow distribution feature 368 of wet plate 340 described hereinabove reduces the volume of flow of the wet fluid in flow channels 364 of the wet plate 340 adjacent the outlets 376 of the flow channels 366 of the dry plate 342. As a result, the relative humidity level of the dry fluid at the outlets 376 of the flow channels 366 adjacent the inlets 370 of the flow channels 364 of the wet plate 340 is caused to decrease to within a desired relative humidity level range and thereby, militate against a formation of liquid water in the fluid channels 366 of the dry plate 342. In a non-limiting example, the desired relative humidity level range is about 45% to about 85%. A variation in relative humidity distribution of the dry fluid across the outlets 376 of the flow channels 366 of the dry plate 342 is minimized.

FIG. 10 schematically illustrates the WVT unit 422 including a fluid flow distribution feature 468 according to another embodiment of the invention. A direction of flow $C_4$ of the dry fluid through the flow channels 466 is substantially perpendicular to a direction of flow $D_4$ of the wet fluid through the flow channels 464 of the wet plate 440. Each of the flow channels 464 of the wet plate 440 has an inlet 470 and an outlet 472 and each of the flow channels 466 of the dry plate 442 has an inlet 474 and an outlet 476.

As illustrated, each individual flow channel 464 of the wet plate 440 is formed to have a substantially uniform cross-sectional flow area from the inlet 470 to the outlet 472. Groups of the flow channels 464 having different widths $W_{WP4}$ form a portion of the fluid flow distribution feature 468 of the WVT unit 422. The fluid flow distribution feature 468 controls a volume of flow of the wet fluid through each of the flow channels 464 and a flow distribution of the wet fluid across the wet plate 440. In particular, a first group of flow channels 464 adjacent the inlets 474 of the flow channels 466 of the dry plate 442 has a greater width $W_{WP4}$ than a second group of flow channels 464 adjacent thereto so that each of the first group of flow channels 464 can accommodate more wet fluid than each of the second group of flow channels 464. The second group of flow channels 464 has a greater width $W_{WP4}$ than a third group of flow channels 464 adjacent the outlets 476 of the flow channels 466 of the dry plate 442 so that each of the second group of flow channels 464 can accommodate more wet fluid than each of the third group of flow channels 464. Accordingly, a volume of each of the flow channels 464 and the volume of flow of the wet fluid therein decrease across the wet plate 440 from the inlets 474 of the dry plate 442 to the outlets 476 thereof. Additional or fewer groups of flow channels 464 than shown can be employed if desired. In the embodiment shown, the volumes of the flow channels 464 of the wet plate 440 are modified by changing the widths $W_{WP4}$ of the flow channels 464. It is understood, however, that the volumes of the flow channels 464 can be modified by varying a depth, a cross-sectional shape, or a length of the flow channels 464, if desired.

Each individual flow channel 466 of the dry plate 442 is formed to have a substantially uniform cross-sectional flow area from the inlet 474 to the outlet 476. Groups of the flow channels 466 having different widths $W_{DP4}$ form another portion of the fluid flow distribution feature 468 of the WVT unit 422. The fluid flow distribution feature 468 including the groups of the flow channels 464 having different widths $W_{WP4}$ and the groups of the flow channels 466 having different widths $W_{DP4}$ differentiates the WVT unit 422 from the WVT units 22, 122, 222, 322 shown in FIGS. 6-9 and described hereinabove. The fluid flow distribution feature 468 further controls a volume of flow of the dry fluid through each of the flow channels 466 and a flow distribution of the dry fluid across the dry plate 442. In particular, a first group of flow channels 466 adjacent the inlets 470 of the flow channels 464 of the wet plate 440 has a greater width $W_{DP4}$ than a second group of flow channels 466 adjacent thereto so that each of the first group of flow channels 466 can accommodate more dry fluid than each of the second group of flow channels 466. The second group of flow channels 466 has a greater width $W_{DP4}$ than a third group of flow channels 466 adjacent the outlets 472 of the flow channels 464 of the wet plate 440 so that each of the second group of flow channels 466 can accommodate more dry fluid than each of the third group of flow channels 466. Accordingly, a volume of each of the flow channels 466 and the volume of flow of the dry fluid therein decrease across the dry plate 442 from the inlets 470 of the wet plate 440 to the outlets 472 thereof. Additional or fewer groups of flow channels 466 than shown can be employed if desired. In the embodiment shown, the volumes of the flow channels 466 of the dry plate 442 are modified by changing the widths $W_{DP4}$ of the flow channels 466. It is understood, however, that the volumes of the flow channels 466 can be modified by varying a depth, a cross-sectional shape, or a length of the flow channels 466, if desired.

A relative humidity level of the dry fluid is greatest at the outlets 476 of the flow channels 466 of the dry plate 442 adjacent the inlets 470 of the flow channels 464 of the wet plate 440. The fluid flow distribution feature 468 described hereinabove reduces the volume of flow of the wet fluid in flow channels 464 of the wet plate 440 adjacent the outlets 476 of the flow channels 466 of the dry plate 442. The fluid flow distribution feature 468 described hereinabove also increases the volume of the flow of the dry fluid in flow channels 466 of the dry plate 442 adjacent inlets 470 of flow channels 464 of wet plate 440. As a result, the relative humidity level of the dry fluid at the outlets 476 of the flow channels 466 adjacent the inlets 470 of the flow channels 464 of the wet plate 440 is caused to decrease to within a desired relative humidity level range, and thereby, militate against a formation of liquid water in the fluid channels 466 of the dry plate 442. In a non-limiting example, the desired relative humidity level range is about 45% to about 85%. A variation in relative humidity distribution of the dry fluid across the outlets 476 of the flow channels 466 of the dry plate 442 is minimized.

FIG. 11 schematically illustrates the WVT unit 522 including a fluid flow distribution feature 568 according to another embodiment of the invention. A direction of flow $C_5$ of the dry fluid through the flow channels 566 is substantially perpendicular to a direction of flow $D_5$ of the wet fluid through the flow channels 564 of the wet plate 540. Each of the flow channels 564 of the wet plate 540 has an inlet 570 and an outlet 572 and each of the flow channels 566 of the dry plate 542 has an inlet 574 and an outlet 576.

As illustrated, each individual flow channel 564 of the wet plate 540 is formed to have a substantially uniform cross-sectional flow area from the inlet 570 to the outlet 572. Further, each of the flow channels 564 having different widths $W_{WP5}$ forms a portion of the fluid flow distribution feature 568 of the WVT unit 522. The fluid flow distribution feature 568 controls a volume of flow of the wet fluid through each of the flow channels 564 and a flow distribution of the wet fluid across the wet plate 540. In particular, starting with the flow channel 564 adjacent the inlets 574 of the flow channels 566 of the dry plate 542, each of the flow channels 564 has a greater width $W_{WP5}$ than the flow channel 564 adjacent thereto. Accordingly, each of the flow channels 564, starting with the flow channel 564 adjacent the inlets 574 of the flow channels 566 of the dry plate 542, can accommodate more wet fluid than the adjacent flow channels 564. Further, a volume of each of the flow channels 564 and the volume of flow of the wet fluid therein decrease across the wet plate 540 from the inlets 574 of the dry plate 542 to the outlets 576 thereof. In the embodiment shown, the volumes of the flow channels 564 of the wet plate 540 are modified by changing the widths $W_{WP5}$ of the flow channels 564. It is understood, however, that the volumes of the flow channels 564 can be modified by varying a depth, a cross-sectional shape, or a length of the flow channels 564, if desired.

Each individual flow channel 566 of the dry plate 542 is formed to have a substantially uniform cross-sectional flow area from the inlet 574 to the outlet 576. Groups of the flow channels 566 having different widths $W_{DP5}$ form another portion of the fluid flow distribution feature 568 of the WVT unit 522. The fluid flow distribution feature 568 including each of the flow channels 564 having different widths $W_{WP5}$ and the groups of the flow channels 566 having different widths $W_{DP5}$ differentiates the WVT unit 522 from the WVT units 22, 122, 222, 322, 422 shown in FIGS. 6-10 and described hereinabove. The fluid flow distribution feature 568 further controls a volume of flow of the dry fluid through each of the flow channels 566 and a flow distribution of the dry fluid across the dry plate 542. In particular, a first group of flow channels 566 adjacent the inlets 570 of the flow channels 564 of the wet plate 540 has a greater width $W_{DP5}$ than a second group of flow channels 566 adjacent thereto so that each of the first group of flow channels 566 can accommodate more dry fluid than each of the second group of flow channels 566. The second group of flow channels 566 has a greater width $W_{DP5}$ than a third group of flow channels 566 adjacent the outlets 572 of the flow channels 564 of the wet plate 540 so that each of the second group of flow channels 566 can accommodate more dry fluid than each of the third group of flow channels 566. Accordingly, a volume of each of the flow channels 566 and the volume of flow of the dry fluid therein decrease across the dry plate 542 from the inlets 570 of the wet plate 540 to the outlets 572 thereof. Additional or fewer groups of flow channels 566 than shown can be employed if desired. In the embodiment shown, the volumes of the flow channels 566 of the dry plate 542 are modified by changing the widths $W_{DP5}$ of the flow channels 566. It is understood, however, that the volumes of the flow channels 566 can be modified by varying a depth, a cross-sectional shape, or a length of the flow channels 566, if desired.

A relative humidity level of the dry fluid is greatest at the outlets 576 of the flow channels 566 of the dry plate 542 adjacent the inlets 570 of the flow channels 564 of the wet plate 540. The fluid flow distribution feature 568 described hereinabove reduces the volume of flow of the wet fluid in flow channels 564 of the wet plate 540 adjacent the outlets 576 of the flow channels 566 of the dry plate 542. The fluid flow distribution feature 568 described hereinabove also increases the volume of the flow of the dry fluid in flow channels 566 of the dry plate 542 adjacent inlets 570 of flow channels 564 of wet plate 540. As a result, the relative humidity level of the dry fluid at the outlets 576 of the flow channels 566 adjacent the inlets 570 of the flow channels 564 of the wet plate 540 is caused to decrease to within a desired relative humidity level range, and thereby, militate against a formation of liquid water in the fluid channels 566 of the dry plate 542. In a non-limiting example, the desired relative humidity level range is about 45% to about 85%. A variation in relative humidity distribution of the dry fluid across the outlets 576 of the flow channels 566 of the dry plate 542 is minimized.

FIG. 12 schematically illustrates the WVT unit 622 including a fluid flow distribution feature 668 according to another embodiment of the invention. A direction of flow $C_6$ of the dry fluid through the flow channels 666 is substantially perpendicular to a direction of flow $D_6$ of the wet fluid through the flow channels 664 of the wet plate 640. Each of the flow channels 664 of the wet plate 640 has an inlet 670 and an outlet 672 and each of the flow channels 666 of the dry plate 642 has an inlet 674 and an outlet 676.

As illustrated, each individual flow channel 664 of the wet plate 640 is formed to have a substantially uniform cross-sectional flow area from the inlet 670 to the outlet 672. Groups of the flow channels 664 having different widths $W_{WP6}$ form a portion of the fluid flow distribution feature 668 of the WVT unit 622. The fluid flow distribution feature 668 controls a volume of flow of the wet fluid through each of the flow channels 664 and a flow distribution of the wet fluid across the wet plate 640. In particular, a first group of flow channels 664 adjacent the inlets 674 of the flow channels 666 of the dry plate 642 has a greater width $W_{WP6}$ than a second group of flow channels 664 adjacent thereto so that each of the first group of flow channels 664 can accommodate more wet fluid than each of the second group of flow channels 664. The second group of flow channels 664 has a greater width $W_{WP6}$ than a third group of flow channels 664 adjacent the outlets 676 of the flow channels 666 of the dry plate 642 so that each of the second group of flow channels 664 can accommodate more wet fluid than each of the third group of flow channels 664. Accordingly, a volume of each of the flow channels 664 and the volume of flow of the wet fluid therein decrease across the wet plate 640 from the inlets 674 of the dry plate 642 to the outlets 676 thereof. Additional or fewer groups of flow channels 664 than shown can be employed, if desired. In the embodiment shown, the volumes of the flow channels 664 of the wet plate 640 are modified by changing the widths $W_{WP6}$ of the flow channels 664. It is understood, however, that the volumes of the flow channels 664 can be modified by varying a depth, a cross-sectional shape, or a length of the flow channels 664, if desired.

Each individual flow channel 666 of the dry plate 642 is formed to have a substantially uniform cross-sectional flow area from the inlet 674 to the outlet 676. Further, each of the flow channels 666 having different widths $W_{DP6}$ forms another portion of the fluid flow distribution feature 668 of the WVT unit 622. The fluid flow distribution feature 668 including the groups of the flow channels 664 having different widths $W_{WP6}$ and each of the flow channels 666 having different widths $W_{DP6}$ differentiates the WVT unit 622 from the WVT units 22, 122, 222, 322, 422, 522 shown in FIGS. 6-11 and described hereinabove. The fluid flow distribution feature 668 further controls a volume of flow of the dry fluid through each of the flow channels 666 and a flow distribution of the dry fluid across the dry plate 642. In particular, starting with the flow channels 666 adjacent the inlets 670 of the flow channels 664 of the wet plate 640, each of the flow channels 666 has a greater width $W_{DP6}$ than the flow channel 466 adjacent thereto. Accordingly, each of the flow channels 666, starting with the flow channel 666 adjacent the inlets 670 of the flow channels 664 of the wet plate 640, can accommodate more dry fluid than the adjacent flow channels 666. Further, a volume of each of the flow channels 666 and the volume of flow of the dry fluid therein decrease across the dry plate 642 from the inlets 670 of the wet plate 640 to the outlets 672 thereof. In the embodiment shown, the volumes of the flow channels 666 of the dry plate 642 are modified by changing the widths $W_{DP6}$ of the flow channels 666. It is understood, however, that the volumes of the flow channels 666 can be modified by varying a depth, a cross-sectional shape, or a length of the flow channels 666, if desired.

A relative humidity level of the dry fluid is greatest at the outlets 676 of the flow channels 666 of the dry plate 642 adjacent the inlets 670 of the flow channels 664 of the wet plate 640. The fluid flow distribution feature 668 described hereinabove reduces the volume of flow of the wet fluid in flow channels 664 of the wet plate 640 adjacent the outlets 676 of the flow channels 666 of the dry plate 642. The fluid flow distribution feature 668 described hereinabove also increases the volume of the flow of the dry fluid in flow channels 666 of the dry plate 642 adjacent inlets 670 of flow channels 664 of wet plate 640. As a result, the relative humidity level of the dry fluid at the outlets 676 of the flow channels 666 adjacent the inlets 670 of the flow channels 664 of the wet plate 640 is caused to decrease to within a desired relative humidity level range, and thereby, militate against a formation of liquid water in the fluid channels 666 of the dry plate 642. In a non-limiting example, the desired relative humidity level range is about 45% to about 85%. A variation in relative humidity distribution of the dry fluid across the outlets 676 of the flow channels 666 of the dry plate 642 is minimized.

FIG. 13 schematically illustrates the WVT unit 722 including a fluid flow distribution feature 768 according to another embodiment of the invention. A direction of flow $C_7$ of the dry fluid through the flow channels 766 is substantially perpendicular to a direction of flow $D_7$ of the wet fluid through the flow channels 764 of the wet plate 740. Each of the flow channels 764 of the wet plate 740 has an inlet 770 and an outlet 772 and each of the flow channels 766 of the dry plate 742 has an inlet 774 and an outlet 776.

As illustrated, each individual flow channel 764 of the wet plate 740 is formed to have a substantially uniform cross-sectional flow area from the inlet 770 to the outlet 772. Further, each of the flow channels 764 having different widths $W_{WP7}$ forms a portion of the fluid flow distribution feature 768 of the WVT unit 722. The fluid flow distribution feature 768 controls a volume of flow of the wet fluid through each of the flow channels 764 and a flow distribution of the wet fluid across the wet plate 740. In particular, starting with the flow channel 764 adjacent the inlets 774 of the flow channels 766 of the dry plate 742, each of the flow channels 764 has a greater width $W_{WP7}$ than the flow channel 764 adjacent thereto. Accordingly, each of the flow channels 764, starting with the flow channel 764 adjacent the inlets 774 of the flow channels 766 of the dry plate 742, can accommodate more wet fluid than the adjacent flow channels 764. Further, a volume of each of the flow channels 764 and the volume of flow of the wet fluid therein decrease across the wet plate 740 from the inlets 774 of the dry plate 742 to the outlets 776 thereof. In the embodiment shown, the volumes of the flow channels 764 of the wet plate 740 are modified by changing the widths $W_{WP7}$ of the flow channels 764. It is understood, however, that the volumes of the flow channels 764 can be modified by varying a depth, a cross-sectional shape, or a length of the flow channels 764, if desired.

Each individual flow channel 766 of the dry plate 742 is formed to have a substantially uniform cross-sectional flow area from the inlet 774 to the outlet 776. Further, each of the flow channels 766 having different widths $W_{DP7}$ forms another portion of the fluid flow distribution feature 768 of the WVT unit 722. The fluid flow distribution feature 768 including each of the flow channels 764 having different widths $W_{WP7}$ and each of the flow channels 766 having different widths $W_{DP7}$ differentiates the WVT unit 722 from the WVT units 22, 122, 222, 322, 422, 522, 622 shown in FIGS. 6-12 and described hereinabove. The fluid flow distribution feature 768 further controls a volume of flow of the dry fluid through each of the flow channels 766 and a flow distribution of the dry fluid across the dry plate 742. In particular, starting with the flow channel 766 adjacent the inlets 770 of the flow channels 764 of the wet plate 740, each of the flow channels 766 has a greater width $W_{DP7}$ than the flow channel 766 adjacent thereto. Accordingly, each of the flow channels 766, starting with the flow channel 766 adjacent the inlets 770 of the flow channels 764 of the wet plate 740, can accommodate more dry fluid than the adjacent flow channels 766. Further, a volume of each of the flow channels 766 and the volume of flow of the dry fluid therein decrease across the dry plate 742 from the inlets 770 of the wet plate 740 to the outlets 772 thereof. In the embodiment shown, the volumes of the flow channels 766 of the dry plate 742 are modified by changing the widths $W_{DP7}$ of the flow channels 766. It is understood, however, that the volumes of the flow channels 766 can be modified by varying a depth, a cross-sectional shape, or a length of the flow channels 766, if desired.

A relative humidity level of the dry fluid is greatest at the outlets 776 of the flow channels 766 of the dry plate 742 adjacent the inlets 770 of the flow channels 764 of the wet plate 740. The fluid flow distribution feature 768 described hereinabove reduces the volume of flow of the wet fluid in flow channels 764 of the wet plate 740 adjacent the outlets 776 of the flow channels 766 of the dry plate 742. The fluid flow distribution feature 768 described hereinabove also increases the volume of the flow of the dry fluid in flow channels 766 of the dry plate 742 adjacent inlets 770 of flow channels 764 of wet plate 740. As a result, the relative humidity level of the dry fluid at the outlets 776 of the flow channels 766 adjacent the inlets 770 of the flow channels 764 of the wet plate 740 is caused to decrease to within a desired relative humidity level range and thereby, militate against a formation of liquid water in the fluid channels 766 of the dry plate 742. In a non-limiting example, the desired relative humidity level range is about 45% to about 85%. A variation in relative humidity distribution of the dry fluid across the outlets 776 of the flow channels 766 of the dry plate 742 is minimized.

An operation of the fuel cell system 10 including the WVT unit 22 is substantially similar to an operation of the fuel cell system 10 including at least one of the WVT units 122, 222, 322, 422, 522, 622, 722. Therefore, for simplicity, only the operation of the fuel cell system 10 including the WVT unit 22 is described hereinafter.

During the operation of the fuel cell system 10, the dry fluid or cathode supply fluid stream is caused to flow from the fluid source 13 through the conduit 15 to the compressor 14. The compressor 14 compresses the dry fluid. Thereafter, the compressed dry fluid flows from the compressor 14 through the conduit 20 to the CAC 18. The CAC 18 cools the dry fluid. The cool, dry fluid exits the CAC 18 and is caused to flow through the conduit 24 to the WVT unit 22. Simultaneously, the wet fluid or cathode exhaust fluid stream is caused to flow from the cathode side of the fuel cell stack 12 through the cathode exhaust conduit 28 to the WVT unit 22.

Within the WVT unit 22, the dry fluid flows through the flow channels 66 formed in the dry plate 42 and the wet fluid flows through the flow channels 64 of the wet plate 40. During the flow of the dry fluid through the flow channels 66 of the dry plate 42 and the flow of the wet fluid through the flow channels 64 of the wet plate 40, the water and/or water vapor is transferred from the wet fluid to the dry fluid. Accordingly, the dry fluid is humidified by the water and/or water vapor from the wet fluid. The water and/or water vapor transfer may involve the following modes: A) convection mass transport of water vapor in the flow channels 64 of the wet plate 40 and the flow channels 66 of the dry plate 42 and B) diffusion transport through the layers 50, 52 and the membranes 60 adjacent the flow channels 64 of the wet plate 40 and the layers 50, 52 and membranes 60 adjacent the flow channels 66 of the dry plate 42. Additionally, if a pressure differential exists between the flow channels 64 of the wet plate 40 and the flow channels 66 of the dry plate 42, water is transferred through the layers 50, 52 and the membranes 60 by hydraulic forces. Thereafter, the humidified dry fluid exits the flow channels 66 of the dry plate 42 and is caused to flow through the cathode supply conduit 26 to the fuel cell stack 12. The wet fluid then exits the flow channels 64 of the wet plate 40 and is caused to flow to an exhaust.

The fuel cell system 10 may be cooled by the fuel cell stack cooling system 30. In the embodiment shown, the pump 32 causes the cooling fluid to flow from the radiator 32 through the coolant loop 36, and into and through the fuel cell stack 12. Within the fuel cell stack 12, the cooling fluid absorbs heat from the fuel cell stack 12, cooling the fuel cell stack 12. The heated cooling fluid then flows from the fuel cell stack 12 into the radiator 32. Within the radiator 32, the cooling fluid is cooled by the transfer of heat to the ambient air within the radiator 32.

Figure 14:
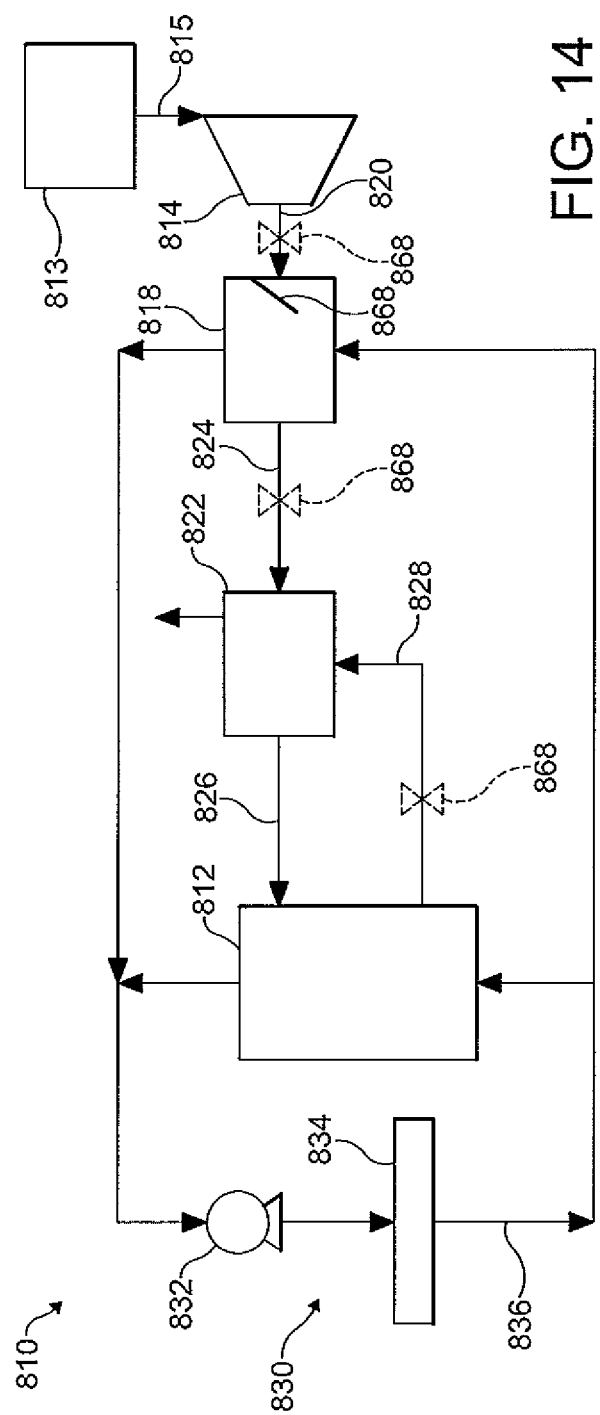
FIG. 14 is a schematic block diagram a fuel cell system including a fluid flow distribution feature according another embodiment of the present invention.

FIG. 14 schematically illustrates the fuel cell system 800 including a fluid flow distribution feature 868 according to another embodiment of the invention. The fuel cell system 800 includes a fuel cell stack 812 having a cathode side and an anode side. A cathode supply fluid stream, depending on a load requirement of the fuel cell stack 812, is supplied from a fluid source 813 to a compressor 814 through a conduit 815. Within the compressor 814, the cathode supply fluid stream is compressed. As shown, the compressor 814 is fluidly connected to a charge air cooler (CAC) 818 through a conduit 820. The CAC 818 cools the cathode supply fluid stream that has been heated as a result of the compression by the compressor 814. It is understood that the CAC 818 can be any type of CAC as desired. The CAC 818 is fluidly connected to a water vapor transfer (WVT) unit 822 through a conduit 824. It is understood that the WVT unit 822 can be any type of WVT unit as desired such as one of the WVT units 22, 122, 222, 322, 422, 522, 622, 722 described hereinabove, for example.

As illustrated, the fuel cell system 800 includes at least one fluid flow distribution feature 868 such as a fixed structure, a flap, a valve, a damper, a guide vane, and the like, for example, disposed in the fluid supply stream of the dry fluid upstream of the WVT unit 822. The fluid flow distribution feature 868 shown is disposed within the CAC 818. The fluid flow distribution feature 868 selectively controls the flow of the dry fluid into the WVT unit 822 and through the flow channels (not shown) of the dry plate (not shown). Accordingly, the fluid flow distribution feature 868 can be employed to direct a greater volume of flow of the dry fluid through the flow channels of the dry plate adjacent the inlets of the flow channels (not shown) of the wet plate (not shown) than a volume of flow of the dry fluid through the flow channels of the dry plate adjacent the outlets of the flow channels of the wet plate. As a result, the volume of flow of the dry fluid in each of the flow channels of the dry plate decreases across the dry plate from the inlets of the wet plate to the outlets thereof. It is understood that the fluid flow distribution feature 868, as indicated by dashed lines shown in FIG. 14, can be disposed in the conduit 820, the conduit 824, and/or the conduit 828, if desired. When the fluid flow distribution feature 868 is disposed in the conduit 828, the fluid flow distribution feature 868 selectively controls the flow of the wet fluid into and through the flow channels of the wet plate. Accordingly, the fluid flow distribution feature 868 can direct a greater volume of flow of the wet fluid through the flow channels of the wet plate adjacent the inlets of the flow channels of the dry plate than a volume of flow of the wet fluid through the flow channels of the wet plate adjacent the outlets of the flow channels of the dry plate. The CAC 818, the conduit 820, the conduit 824, and/or the conduit 828 includes fixed structure (not shown) such as grooves, channels, inner walls, inner tubes, and the like, for example, which permits a flow distribution of the dry fluid across the dry plate of the WVT unit 822 and/or a flow distribution of the wet fluid across the wet plate of the WVT unit 822 to be varied by the fluid flow distribution feature 868.

The WVT unit 822 is also fluidly connected to the fuel cell stack 812. The WVT unit 822 shown is fluidly connected to the cathode side of the fuel cell system 800. However, it is understood that the WVT unit 822 can be fluidly connected to the anode side of the fuel cell system 800 or otherwise as desired. The cathode supply fluid stream is supplied from the WVT unit 822 to the fuel cell stack 812 through a cathode supply conduit 826. A cathode exhaust fluid stream is provided from the fuel cell stack 812 to the WVT unit 822 through a cathode exhaust conduit 828.

Water and/or water vapor in the cathode exhaust fluid stream humidifies the cathode supply fluid stream within the WVT unit 822. In the embodiment shown, by controllably increasing the flow of the dry fluid through the flow channels of the dry plate adjacent to the inlets of the flow channels of wet plate and/or decreasing the flow of wet fluid through the flow channels of the wet plate adjacent to outlets of the flow channels of the dry plate, a relative humidity level of the dry fluid at the outlets of the flow channels of the dry plate adjacent the inlets of the flow channels of the wet plate is caused to decrease to within a desired relative humidity level range, and thereby, militate against a formation of liquid water in the fluid channels of the dry plate. In a non-limiting example, the desired relative humidity level range is about 45% to about 85%. A variation in relative humidity distribution of the dry fluid across the outlets of the flow channels of the dry plate is minimized.

The fuel cell system 800 may include other components necessary for operation such as a temperature sensor (not shown) for measuring a temperature of the cathode supply fluid stream exiting the CAC 818, a relative humidity sensor (not shown) for measuring a relative humidity of the cathode supply fluid stream supplied to the fuel cell stack 812 and/or controlling the fluid flow distribution feature 868 of the CAC 818, and a fuel cell stack cooling system 830, for example. In the embodiment shown, the fuel cell stack cooling system 830 includes a pump 832 and a radiator 834. The pump 832 causes a cooling fluid (e.g. refrigerant) to flow through a coolant loop 836, and into and through the fuel cell stack 812 and the CAC 818. The heated cooling fluid from the fuel cell stack 812 and the CAC 818 is cooled by a transfer of heat to the ambient air within the radiator 832.

During the operation of the fuel cell system 800, the dry fluid or cathode supply fluid stream is caused to flow from the fluid source 813 through the conduit 815 to the compressor 814. The compressor 814 compresses the dry fluid. Thereafter, the compressed dry fluid flows from the compressor 814 through the conduit 820 to the CAC 818. The CAC 818 shown cools the dry fluid using the cooling fluid in the coolant loop 836. The fluid flow distribution feature 868 in the CAC 818 controls the flow of the cool, dry fluid from the CAC 818 through the conduit 824 to the WVT unit 822. Particularly, the fluid flow distribution feature 868 forces more dry fluid through the fluid channels of the dry plate of the WVT unit 822 adjacent the inlets of the fluid channels of the wet plate of the WVT unit 822 than through the fluid channels of the dry plate adjacent the outlets of the fluid channels of the wet plate. Simultaneously, the wet fluid or cathode exhaust fluid stream is caused to flow from the cathode side of the fuel cell stack 812 through the cathode exhaust conduit 828 to the WVT unit 822. Within the WVT unit 822, the dry fluid flows through the flow channels of the dry plate and the wet fluid flows through the flow channels of the wet plate.

During the flow of the dry fluid through the flow channels of the dry plate and the flow of the wet fluid through the flow channels of the wet plate, the water and/or water vapor is transferred from the wet fluid to the dry fluid. Accordingly, the dry fluid is humidified by the water and/or water vapor from the wet fluid. The water and/or water vapor transfer may involve the following modes: A) convection mass transport of water vapor in the flow channels of the wet plate and the flow channels of the dry plate and B) diffusion transport through the layers and the membranes adjacent the flow channels of the wet plate, and the layers and membranes adjacent the flow channels of the dry plate. Additionally, if a pressure differential exists between the flow channels of the wet plate and the flow channels of the dry plate, water is transferred through the layers and the membranes by hydraulic forces. Thereafter, the humidified dry fluid exits the flow channels of the dry plate and is caused to flow through the cathode supply conduit 826 to the fuel cell stack 812. The wet fluid then exits the flow channels of the wet plate and is caused to flow to an exhaust.

The fuel cell system 800 may be cooled by the fuel cell stack cooling system 830. In the embodiment shown, the pump 832 causes the cooling fluid to flow from the radiator 832 through the coolant loop 836, and into and through the fuel cell stack 812. Within the fuel cell stack 812, the cooling fluid absorbs heat from the fuel cell stack 812, cooling the fuel cell stack 812. The heated cooling fluid then flows from the fuel cell stack 812 and the CAC 818 into the radiator 832.

Within the radiator 832, the cooling fluid is cooled by the transfer of heat to the ambient air within the radiator 832.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell system comprising:
   a water vapor transfer unit including a first plate and a second plate, the first plate having a plurality of first flow channels for receiving a flow of a first fluid therein, and the second plate having a plurality of second flow channels for receiving a flow of a second fluid therein, wherein each of the first flow channels and each of the second flow channels includes an inlet and an outlet, wherein each of the first flow channels is substantially perpendicular along a length thereof to each of the second flow channels along a length thereof; and
   a fluid flow distribution feature configured to control at least one of a flow of the first fluid through each of the first flow channels and a flow of the second fluid through each of the second flow channels, wherein at least one of a flow distribution of the first fluid across the first plate is varied wherein the first fluid is unequally distributed amongst the plurality of first flow channels and a flow distribution of the second fluid across the second plate is varied wherein the second fluid is unequally distributed amongst the plurality of second flow channels, wherein the fluid flow distribution feature is configured to reduce a variation in relative humidity between the outlets of the first flow channels.

2. The fuel cell system according to claim 1, wherein the first fluid is a dry fluid and the second fluid is a wet fluid.

3. The fuel cell system according to claim 1, wherein the fluid flow distribution feature includes one of the first flow channels having a greater volume than an adjacent first flow channel.

4. The fuel cell system according to claim 1, wherein the fluid flow distribution feature includes one of the second flow channels having a greater volume than an adjacent second flow channel.

5. The fuel cell system according to claim 1, wherein the fluid flow distribution feature includes a first group of the first flow channels and a second group of the first flow channels, the first flow channels of the first group having a greater volume than the first flow channels of the second group.

6. The fuel cell system according to claim 1, wherein the fluid flow distribution feature includes a first group of the second flow channels and a second group of the second flow channels, the second flow channels of the first group having a greater volume than the second flow channels of the second group.

7. The fuel cell system according to claim 1, wherein the fluid flow distribution feature is disposed in a supply fluid stream of the first fluid upstream of the water vapor transfer unit to control the flow distribution of the first fluid across the first plate.

8. The fuel cell system according to claim 1, wherein the fluid flow distribution feature is disposed in a supply fluid stream of the second fluid upstream of the water vapor transfer unit to control the flow distribution of the second fluid across the second plate.

9. A fuel cell system comprising:
   a water vapor transfer unit including a first plate and a second plate, the first plate having a plurality of first flow channels for receiving a flow of a first fluid therein, and the second plate having a plurality of second flow channels for receiving a flow of a second fluid therein, wherein each of the flow channels of the plates includes an inlet and an outlet and each of the first flow channels is substantially perpendicular along a length thereof to each of the second flow channels along a length thereof; and
   a fluid flow distribution feature including the first flow channels and the second flow channels, wherein a volume of the first flow channels adjacent the inlets of the second flow channels is greater than a volume of the first flow channels adjacent the outlets of the second flow channels, and a volume of the second flow channels adjacent the inlets of the first flow channels is greater than a volume of the second flow channels adjacent the outlets of the first flow channels, wherein the fluid flow distribution feature is configured to reduce a variation in relative humidity between the outlets of the first flow channels.

10. The fuel cell system according to claim 9, wherein the first fluid is a dry fluid and the second fluid is a wet fluid.

11. The fuel cell system according to claim 9, wherein the first flow channels are substantially perpendicular to the second flow channels.

12. The fuel cell system according to claim 9, wherein a volume of each of the first flow channels is greater than each adjacent first flow channel.

13. The fuel cell system according to claim 9, wherein a volume of each of the second flow channels is greater than each adjacent second flow channel.

14. The fuel cell system according to claim 9, wherein a volume of each of a first group of the first flow channels is greater than a volume of each of a second group of the first flow channels, and wherein the first group of the first flow channels is adjacent the inlets of the second flow channels, and the second group of the first flow channels is adjacent the outlets of the second flow channels.

15. The fuel cell system according to claim 14, wherein a third group of the first flow channels is formed between the first group and the second group of the first flow channels, and wherein a volume of each of the third group of the first flow channels is less than the volume of each of the first group of the first flow channels, and greater than the volume of each of the second group of the first flow channels.

16. The fuel cell system according to claim 9, wherein a volume of each of a first group of the second flow channels is greater than a volume of each of a second group of the second flow channels, and wherein the first group of the second flow channels is adjacent the inlets of the first flow channels, and the second group of the second flow channels is adjacent the outlets of the second flow channels.

17. The fuel cell system according to claim 16, wherein a third group of the second flow channels is formed between the first group and the second group of the second flow channels, and wherein a volume of each of the third group of the second flow channels is less than the volume of each of the first group of the second flow channels, and greater than the volume of each of the second group of the second flow channels.

18. A fuel cell system comprising:
   a water vapor transfer unit including a first plate and a second plate, the first plate having a plurality of first flow channels for receiving a flow of a first fluid therein, and the second plate having a plurality of second flow channels for receiving a flow of a second fluid therein, wherein each of the first flow channels and each of the second flow channels includes an inlet and an outlet, wherein each of the first flow channels is substantially perpendicular along a length thereof to each of the second flow channels along a length thereof; and a first fluid flow distribution feature disposed in a charge air cooler of the fuel cell system upstream of the water vapor transfer unit to control a volume of flow of the first fluid through the first flow channels, wherein the first fluid flow distribution feature directs a greater volume of flow of the first fluid through the first flow channels adjacent the inlets of the second flow channels than through the first flow channels adjacent the outlets of the second flow channels, wherein the fluid flow distribution feature is configured to reduce a variation in relative humidity between the outlets of the first flow channels.

19. The fuel cell system according to claim 18, further comprising a second fluid flow distribution feature disposed upstream of the water vapor transfer unit to control a volume of flow of the second fluid through the second flow channels, wherein the second fluid flow distribution feature directs a greater volume of flow of the second fluid through the second flow channels adjacent the inlets of the first flow channels than through the second flow channels adjacent the outlets of the first flow channels.

20. The fuel cell system according to claim 1, wherein each of the first flow channels has a first flow channel inlet and a first flow channel outlet and a substantially uniform cross-sectional flow area from the first flow channel inlet to the first flow channel outlet, wherein each of the second flow channels has a second flow channel inlet and a second flow channel outlet and a substantially uniform cross-sectional flow area from the second flow channel inlet to the second flow channel outlet.

* * * * *